US012731178B1

United States Patent
(12) United States Patent
Langley

(10) Patent No.: US 12,731,178 B1
(45) **Date of Patent: *Sep. 8, 2026**

(54) SYSTEMS AND METHODS FOR PROVIDING PRODUCT AND SERVICE QUOTES TO CUSTOMERS

(71) Applicant: United Services Automobile Association ("USAA"), San Antonio, TX (US)

(72) Inventor: Guy R. Langley, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 79 days.

This patent is subject to a terminal disclaimer.

(21) Appl. No.: 18/819,598

(22) Filed: Aug. 29, 2024

Related U.S. Application Data

(60) Continuation of application No. 18/207,939, filed on Jun. 9, 2023, now Pat. No. 12,106,344, which is a (Continued)

(51) Int. Cl.
*G06Q 30/00* (2023.01)
*G06F 3/0482* (2013.01)
(Continued)

(52) U.S. Cl.
CPC ....... *G06Q 30/0613* (2013.01); *G06F 3/0482* (2013.01); *G06F 3/0483* (2013.01); *G06F 3/04842* (2013.01); *G06F 40/134* (2020.01)

(58) Field of Classification Search
CPC . G06Q 30/0613; G06F 40/134; G06F 3/0482; G06F 3/0483; G06F 3/04842
See application file for complete search history.

(56) References Cited

U.S. PATENT DOCUMENTS

| | | | |
|---|---|---|---|
| 2005/0017752 | A1 | 1/2005 | Kim |
| 2005/0177525 | A1 | 8/2005 | Apple et al. |

(Continued)

OTHER PUBLICATIONS

Lau, Mei Mei. "Measuring Service Quality in the Banking Industry: A Hong Kong Based Study" Contemporary Management Research. pp 263-282, vol. 9, No. 3, Sep. 2013 (Year: 2013).

*Primary Examiner* — Anand Loharikar
(74) *Attorney, Agent, or Firm* — Plumsea Law Group, LLC

(57) ABSTRACT

A computer-implemented method and system for streamlining interactions between a customer and a customer service representative of a company. An interaction is commenced between the customer and the customer service representative during which historical data is accessed related to the customer stored in a company controlled computer system responsive to the interaction. The historical data preferably relates to at least one product or service provided by the company to the customer. At least a part of the historical information is displayed to the customer service representative. On the display, a first tab is generated related to the historical data as is a second tab relating to a quote for a new product or service for offering to the customer. The customer service representative is thereafter enabled to switch between displaying the historical data and the quote by selecting the first or second tab, respectively, without having to save the quote.

18 Claims, 16 Drawing Sheets

Related U.S. Application Data continuation of application No. 16/925,555, filed on Jul. 10, 2020, now Pat. No. 11,715,140, which is a division of application No. 14/855,453, filed on Sep. 16, 2015, now Pat. No. 10,846,767.

(60) Provisional application No. 62/051,725, filed on Sep. 17, 2014.

(51) Int. Cl.

| | |
|---|---|
| ***G06F 3/0483*** | (2013.01) |
| ***G06F 3/04842*** | (2022.01) |
| ***G06F 40/134*** | (2020.01) |
| ***G06Q 30/0601*** | (2023.01) |

(56) References Cited

U.S. PATENT DOCUMENTS

2010/0169159 A1* 7/2010 Rose .................. G06Q 30/0278 705/7.29
2011/0225506 A1* 9/2011 Casalaina ............ G06F 3/0481 715/744

* cited by examiner

Member Dashboard

Dale Rogers

Cable installation Technician at Time Warner Cable 26 years old

Permanent Address

254 Cherry Lane
Chicago, IL 60623

Member Notes

- Excited to learn about investing
-

| 95% | P&C | – | 5 yrs |
|---|---|---|---|
| Satisfaction | Eligibility | Special Status | Tenure |

FAMILY edit 27 years old — Melissa
3 years old — Sally
1 month old — Sam

PREFERENCES

Product Reviews

FREE CHECKING ☆☆☆☆☆

SAVINGS ☆☆☆☆☆

Local Time

WEB
MOBILE
PHONE
IN PERSON

WHAT'S GOING ON

Local Time
5:24 PM

Current Events

- Chicago Bulls vs Miami Heat: The Eastern Conference debate
- Chicago small businesses anticipate their companies economic outlook will improve in the next 12–18 months Interests

- Fishing at the lake
- Mountaineering
-

FIG. 5B

Figure 5D:
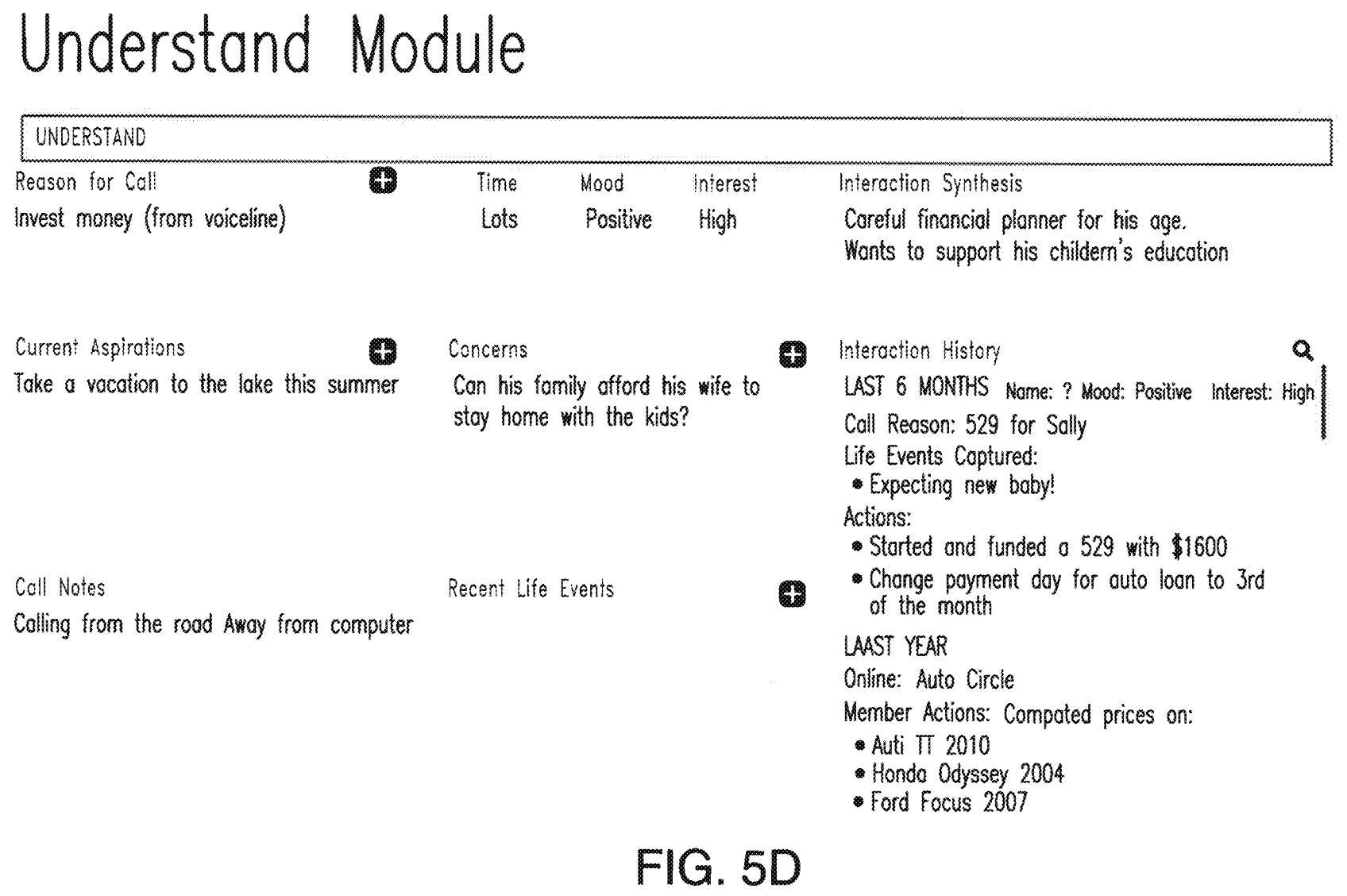

Understand Module

UNDERSTAND

Reason for Call
Invest money (from voiceline)

Time: Lots
Mood: Positive
Interest: High

Interaction Synthesis
Careful financial planner for his age.
Wants to support his childern's education Current Aspirations
Take a vacation to the lake this summer Concerns
Can his family afford his wife to stay home with the kids?

Interaction History
LAST 6 MONTHS Name: ? Mood: Positive Interest: High
Call Reason: 529 for Sally
Life Events Captured:
- Expecting new baby!

Actions:
- Started and funded a 529 with $1600
- Change payment day for auto loan to 3rd of the month LAAST YEAR
Online: Auto Circle
Member Actions: Compated prices on:
- Auti TT 2010
- Honda Odyssey 2004
- Ford Focus 2007

Call Notes
Calling from the road Away from computer

Recent Life Events

Figure 6D:
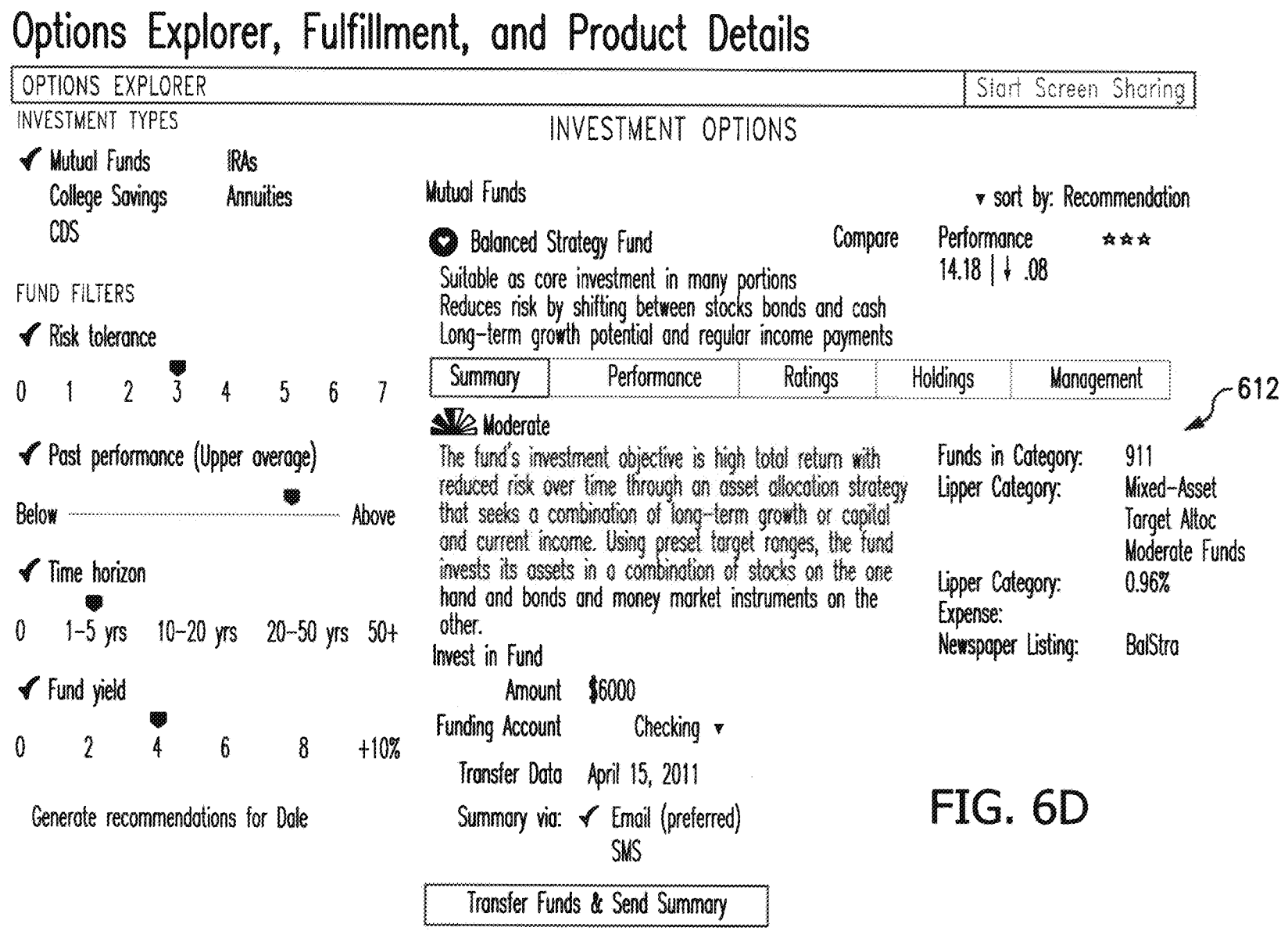

Options Explorer, Fulfillment, and Product Details

OPTIONS EXPLORER | Start Screen Sharing

INVESTMENT TYPES

✓ Mutual Funds IRAs
College Savings Annuities
CDS

FUND FILTERS

✓ Risk tolerance 0 1 2 3 4 5 6 7

✓ Past performance (Upper average)

Below ---- Above

✓ Time horizon 0 1–5 yrs 10–20 yrs 20–50 yrs 50+

✓ Fund yield 0 2 4 6 8 +10%

Generate recommendations for Dale

INVESTMENT OPTIONS

Mutual Funds ▾ sort by: Recommendation

Balanced Strategy Fund Compare Performance ★★★
14.18 | ↓ .08

Suitable as core investment in many portions
Reduces risk by shifting between stocks bonds and cash
Long–term growth potential and regular income payments

| Summary | Performance | Ratings | Holdings | Management |
|---|---|---|---|---|

Moderate

The fund's investment objective is high total return with reduced risk over time through an asset allocation strategy that seeks a combination of long–term growth or capital and current income. Using preset target ranges, the fund invests its assets in a combination of stocks on the one hand and bonds and money market instruments on the other.

Funds in Category: 911
Lipper Category: Mixed–Asset Target Altoc Moderate Funds
Lipper Category: Expense: 0.96%
Newspaper Listing: BalStra Invest in Fund Amount $6000
Funding Account Checking ▾
Transfer Data April 15, 2011
Summary via: ✓ Email (preferred)
SMS Transfer Funds & Send Summary

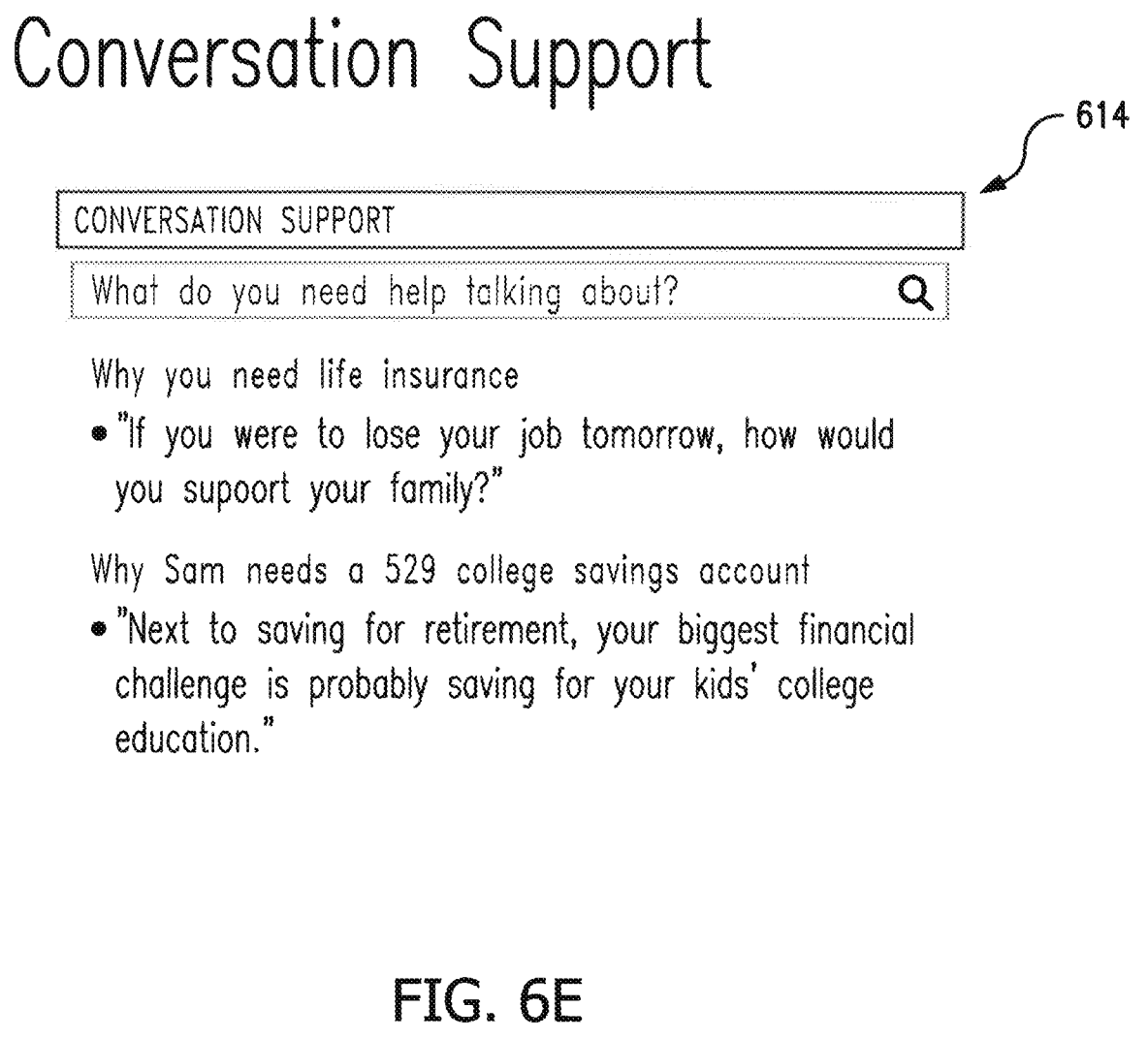

Conversation Support

614

CONVERSATION SUPPORT

What do you need help talking about?

Why you need life insurance

- "If you were to lose your job tomorrow, how would you supoort your family?"

Why Sam needs a 529 college savings account

- "Next to saving for retirement, your biggest financial challenge is probably saving for your kids' college education."

FIG. 6E

SYSTEMS AND METHODS FOR PROVIDING PRODUCT AND SERVICE QUOTES TO CUSTOMERS

CROSS REFERENCE TO RELATED APPLICATIONS

This application is a Continuation of U.S. patent application Ser. No. 18/207,939 filed Jun. 9, 2023, which is a is a Continuation of U.S. patent application Ser. No. 16/925,555 filed Jul. 10, 2020, which is a Divisional of U.S. patent application Ser. No. 14/855,453 filed Sep. 16, 2015, which claims priority to U.S. Patent Application Ser. No. 62/051,725 filed Sep. 17, 2014 which is incorporated herein by reference in its entirety.

FIELD OF THE INVENTION

The present invention relates to support systems for customer service representatives, and more particularly, to providing call center representatives with easy access to customer related data and quotes related to products and services for the customer.

BACKGROUND OF THE INVENTION

Traditional call centers have incorporated technology in an effort to provide improved customer service. However, when providing price quotes for goods and services, customer service representatives are required to enter an application for providing the particular good or service. Such applications will require entry of the customer's general information as well as information that is pertinent to the particular quote. If review of a previous different quote is required, the customer service representative must save and close the current application, and restart the other. Despite advances in technology, the ability to streamline interactions with customers remains an elusive goal. For another example, when customers call a company to enroll or change their services with the company, very often the conversation must be paused to allow the representative time to find the program and/or webpage that relates to the customer's desired action.

Often, referral from one customer service representative to another for specialized services is desirable. In such a case, traditional call centers have no ability to facilitate hand-off between customer service representatives beyond placing the customer on hold while the first representative tries to fill in the second representative. This not only yields often poor and inconsistent results, but creates dissatisfaction among the customers on hold and after reconnection when details and information already presented must be discussed again. The need exists for the information developed during the interaction by the first customer service representative to be made handy for the second customer service representative.

Accordingly, there is an unmet need to provide companies, such as financial services and insurance companies, the ability to streamline interactions with their customers even when more than one product and/or service is discussed with a customer during a single or multiple interactions.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a computer-implemented method and system for streamlining interactions between a customer and a customer service representative of a company is described in which an interaction is commenced between the customer and the customer service representative during which historical data is accessed related to the customer stored in a company controlled computer system responsive to the interaction. The historical data preferably relates to at least one product or service provided by the company to the customer. At least a part of the historical information is displayed to the customer service representative. On the display, a first tab is generated related to the historical data as is a second tab relating to a quote for a new product or service for offering to the customer. The customer service representative is thereafter enabled to switch between displaying the historical data and the quote by selecting the first or second tab, respectively, without having to save the quote.

BRIEF DESCRIPTION OF THE DRAWINGS

So that those having ordinary skill in the art, to which the present embodiments pertain, will more readily understand how to employ the novel system and methods, certain illustrated embodiments thereof will be described in detail herein-below with reference to the drawings, wherein:

FIGS. 5B-D are views of portions of the screen shot of FIG. 5A.

FIGS. 6B-F are views of portions of the screen shot of FIG. 6A.

DETAILED DESCRIPTION OF CERTAIN EMBODIMENTS

The below illustrated embodiments are directed to streamlining and improving customer interactions based on analysis of all available data relevant to the customer. It is to be appreciated that the below illustrated embodiments are not limited in any way to what is shown, as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the certain illustrated embodiments. Also, the flow charts and methods described herein do not imply either required steps or a required order to the steps, and the illustrated embodiments and processes may be implemented in any order and/or combination that is practicable.

Unless defined otherwise, all technical and scientific terms used herein have the same meaning as commonly understood by one of ordinary skill in the art relating to the below illustrated embodiments. Although any methods and materials similar or equivalent to those described herein can also be used in the practice or testing of the below illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art.

It is to be appreciated the certain embodiments described herein may be utilized in conjunction with a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be executed by a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the certain embodiments described herein. Thus the certain embodiments are not to be understood to be limited by what has been particularly shown and described, except as indicated by the appended claims.

Figure 1:
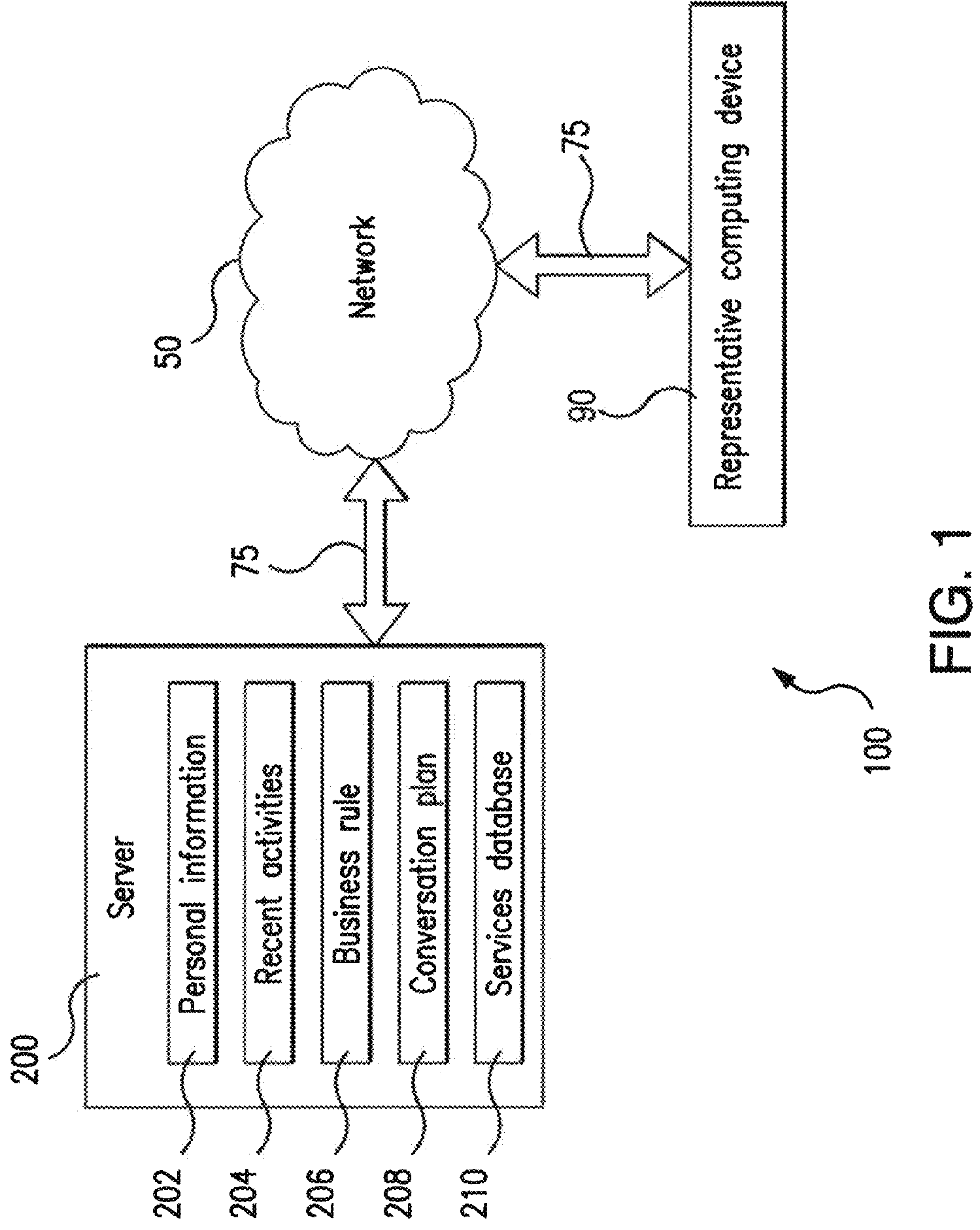
FIG. 1 is an exemplary system for streamlining customer interactions.

Referring to FIG. 1, a hardware diagram depicting a system 100 in which the processes described herein can be executed is provided for exemplary purposes. In one embodiment, system 100 includes a server 200 communicating with a representative computing device 90 across a network 50 with communication channels 75. The server 200 stores personal information 202 about customers, recent activities data 204 related to the customers, business rules 206 to be applied as described herein, conversation plans 208 that are generated, and a services database 210, which includes information about various services a company may offer.

For exemplary purposes only, personal information 202 about customers may include the customer's legal name, what name they preferred to be called by, names of their family members (including former family members such as ex-spouses), ages for the customer and their family, how the customer is eligible for coverage (if applicable). Recent activities data 204 by the customer may include the customer enrolling in a service that the company offers (e.g., mortgage, automobile loan, auto/home/life insurance, banking, and credit card), changing the settings of a service already enrolled in (e.g., raising the deductible and lowering the premium of an auto insurance policy), calling the company to ask a question and/or discuss a topic, researching information on the company's website, and/or researching information on the internet and later visiting the company's website (e.g., wherein the company's servers may glean past Internet activities based on "cookies").

Business rules 206 may include associations, correlations and/or causations between (1) information and/or past activities and (2) future activities. For example, a business rule may reflect the relationship between (1) a child attaining the age of 15 and (2) adding another member to an auto insurance policy. In another example, a business rule may associate (1) browsing the company's website searching for life insurance information and (2) the subsequent phone call to the company being a request to (2a) enroll in a life insurance policy, or (2b) change the settings of an existing life insurance policy. In yet another example, a business rule may associate (1) a customer attaining retirement age and (2) the customer lowering their life insurance premium to a lower amount.

In one embodiment, a conversation plan 208 may include a series of topics about which the company's representative can discuss with the customer. For example, if the customer is about to turn 65 years old and has a child about to turn 15 years old, the conversation plan may include the representative first suggesting to talk about adding the child to an auto insurance policy, and subsequently discussing if the customer wants to amend their life insurance policy. In yet another example, a conversation plan may include asking about each service the customer is enrolled in with reference being made to the most recent event associated with each service (e.g., the first topic may be asking if the customer wants to amend their recently added home insurance policy, and the second topic may be asking the customer about the additional member she added to her auto insurance policy a year ago).

The services database 210 includes information related to the customer's enrollment in any services that are offered by the company. Such information may include the details of the customer's policies, the details of previous settings to current policies, and the details of the settings to previous policies the customer has enrolled in. For example, if a company offers credit card services, mortgage services, banking services, automobile loan services, investment services, insurance services and housing services, the services database may include information related to their customers' involvement with those services.

Figure 2:
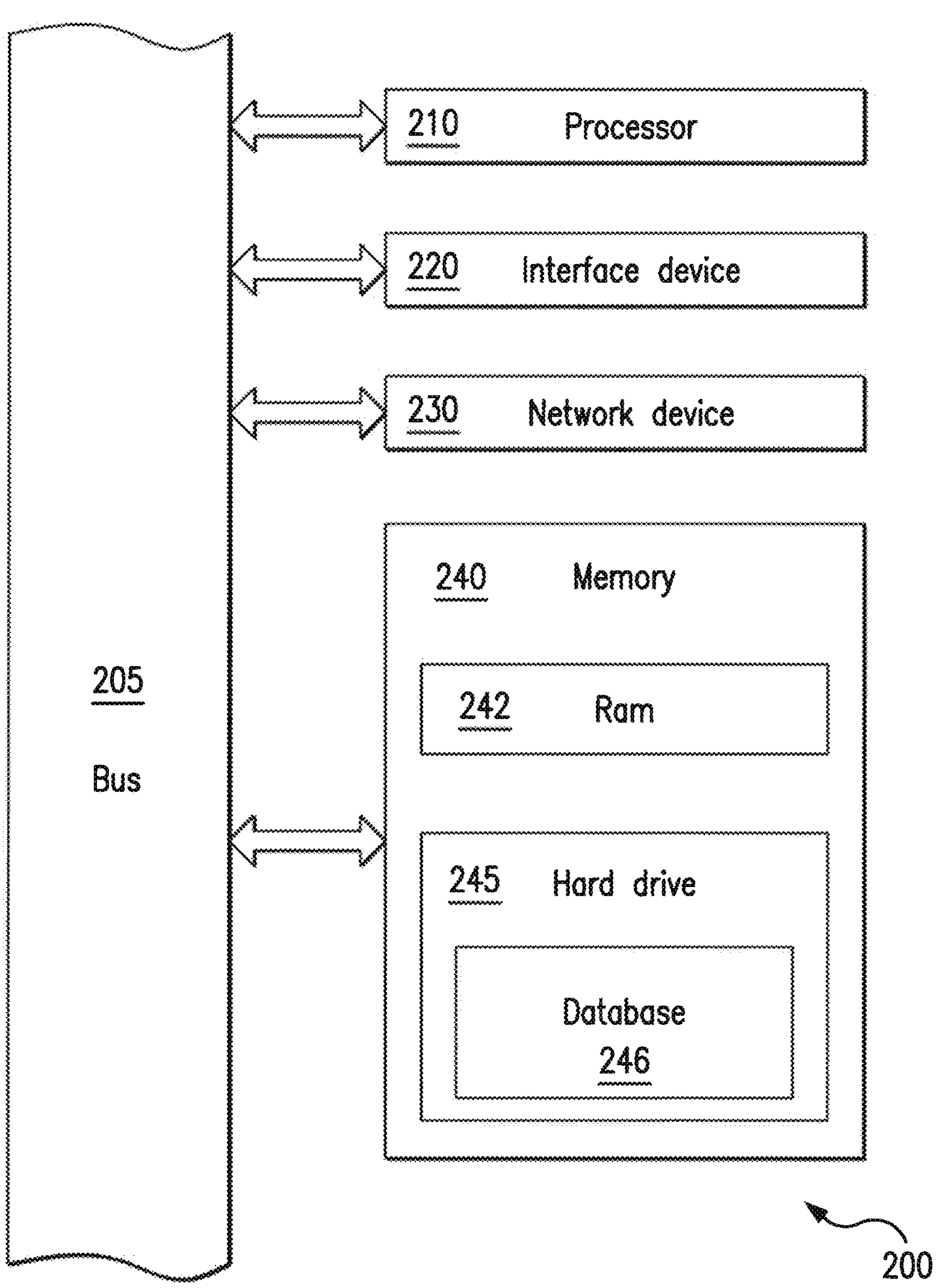
FIG. 2 is a flow chart illustrating an exemplary method of utilizing the exemplary embodiment of FIG. 1.

Turning now to FIG. 2, illustrated therein is an exemplary embodiment of computing device 200 for use in the system 100. Such a computing device 200 is exemplary of how a server 200 and even how a representative computing device 90 may be configured. The following discussion is principally with respect to the computing device 200 when functioning as the server 200. The server 200 preferably includes bus 205, over which intra-device communications travel. A processor 210, interface device 220, network device 230, and memory 240 all communication across the bus 205. The server 200 also preferably includes RAM 242 and hard drive 245 for storage.

The term "module"/"engine" is used herein to denote a functional operation that may be embodied either as a stand-alone component or as an integrated configuration of a plurality of subordinate components. Thus, "modules"/"engines" may be implemented as a single module or as a plurality of modules that operate in cooperation with one another. Moreover, although "modules"/"engines" may be described herein as being implemented as software, they could be implemented in any of hardware (e.g. electronic circuitry), firmware, software, or a combination thereof.

Memory 240 is a computer-readable medium encoded with a computer program. Memory 240 stores data and instructions that are readable and executable by processor 310 for controlling the operation of processor 210. Memory 240 may be implemented in random access memory 242 (RAM), a non-transitory computer readable medium, volatile or non-volatile memory, solid state storage devices, magnetic devices, hard drive 245, database 246, a read only memory (ROM), or a combination thereof.

Processor 210 is an electronic device configured of logic circuitry that responds to and executes instructions. Processor 210 outputs results of an execution of the methods described herein. Alternatively, processor 210 could direct the output to a remote device (not shown) via network 50.

It is to be further appreciated that computer networks, upon which the embodiments described herein my interact and/or function, can include a local area network (LAN) and a wide area network (WAN), other networks such as a personal area network (PAN), or any combination thereof. Such networking environments are commonplace in offices, enterprise-wide computer networks, intranets, and the Internet. For instance, when used in a LAN networking environment, the system 100 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the system 100, or portions thereof, may be stored in a remote memory storage device such as storage medium. It is to be appreciated that the illustrated network connections of FIG. 1 are exemplary and other means of establishing a communications link between multiple computers may be used.

It should be understood that computing devices 200 each generally include at least one processor, at least one interface, and at least one memory device coupled via buses. Computing devices 200 may be capable of being coupled together, coupled to peripheral devices, and input/output devices. Computing devices 200 are represented in the drawings as standalone devices, but are not limited to such. Each can be coupled to other devices in a distributed processing environment.

Figure 3:
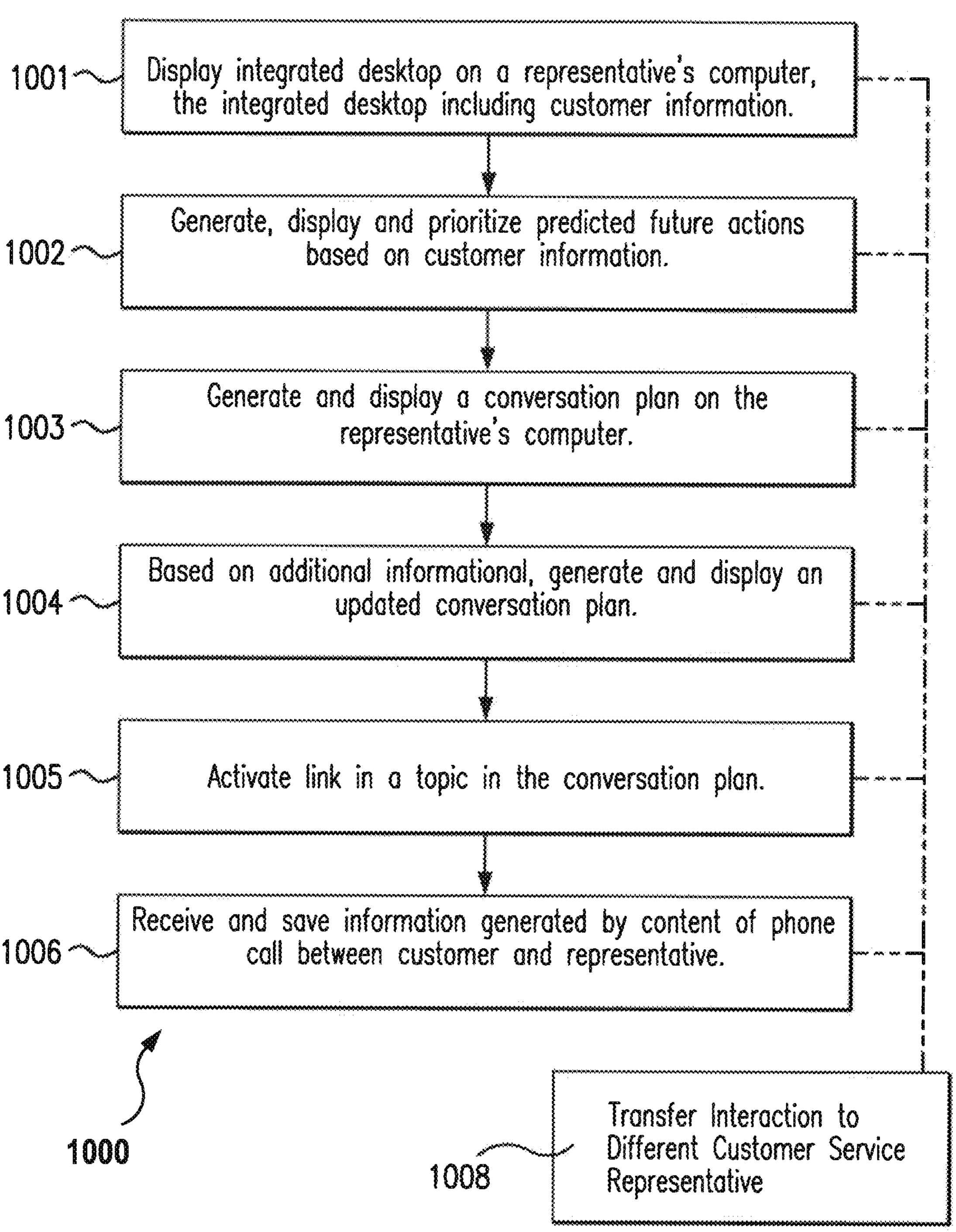
FIG. 3 is an illustration of an embodiment of a computing device.

Turning to FIG. 3, illustrated therein is an exemplary process 1000 of utilizing system 100. Starting at step 1001, an integrated desktop is displayed on a computer 90 operated by a representative of a company. In one embodiment, the integrated desktop includes customer information about a customer who called the representative, such as, for exemplary purposes only, personal information about the customer, the customer's family's information, the customer's age, recent activities the customer has engaged in (e.g., withdrawal of $9,000 from an emergency fund, a fixed rate loan of $40,000), status of the phone call (e.g., if the customer has been transferred and how many times, how long the customer has been on hold, how long the call has lasted), an indication of the customer's preferred nickname (e.g., "Tommy" instead of "Thomas"). Additionally, the integrated desktop may include a button to transfer the call to another party within the company.

Figure 4:
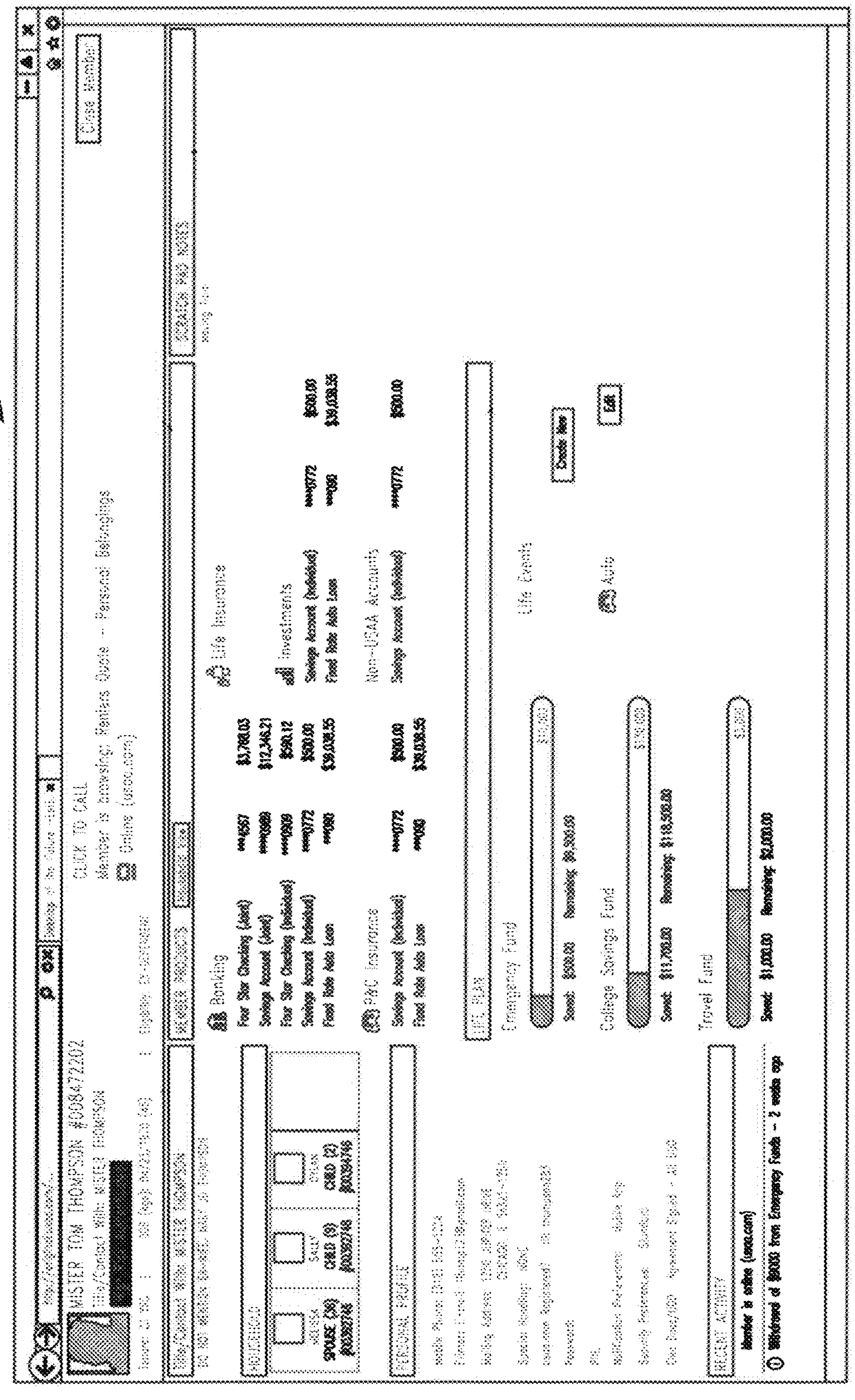
FIG. 4 is an exemplary screen shot for review by and interaction with a customer service representative in accordance with the subject technology.

For example, a typical screen shot 400 is shown in FIG. 4 for a customer named Tom Thompson. The screen shot 400 provides conversational, status, product and other information related to the customer, Mr. Thompson. By reviewing the information of the screen shot 400, the customer service representative is better able to have a productive, efficient and smooth dialogue with the customer. It is envisioned that the customer service representative gleens available cues from the screen shot 400 to inform her expectations for the upcoming interaction with the customer.

Figures 5A, 6A:
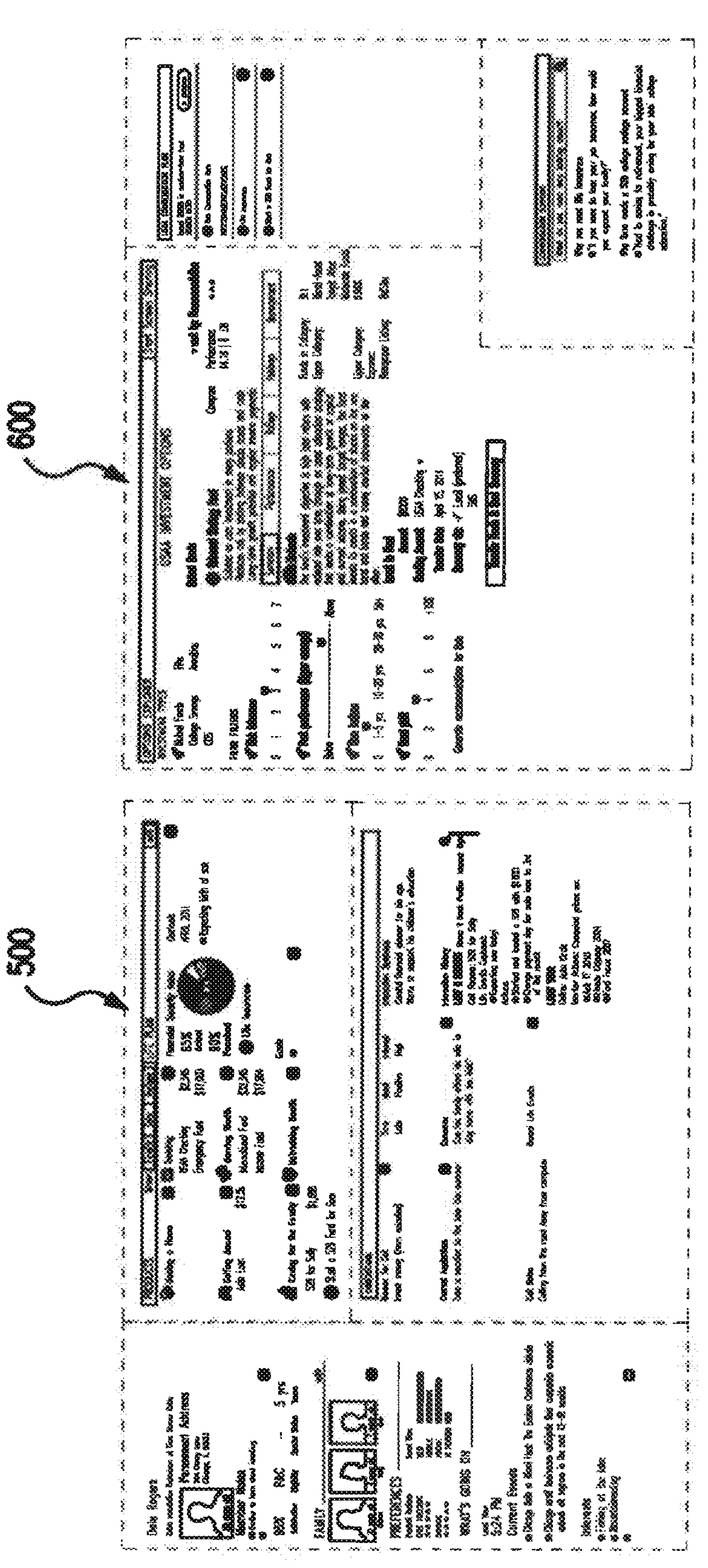
FIG. 5A is another exemplary screen shot for review by and interaction with a customer service representative in accordance with the subject technology.
FIG. 6A is still another exemplary screen shot for review by and interaction with a customer service representative in accordance with the subject technology.
Figure 5C:
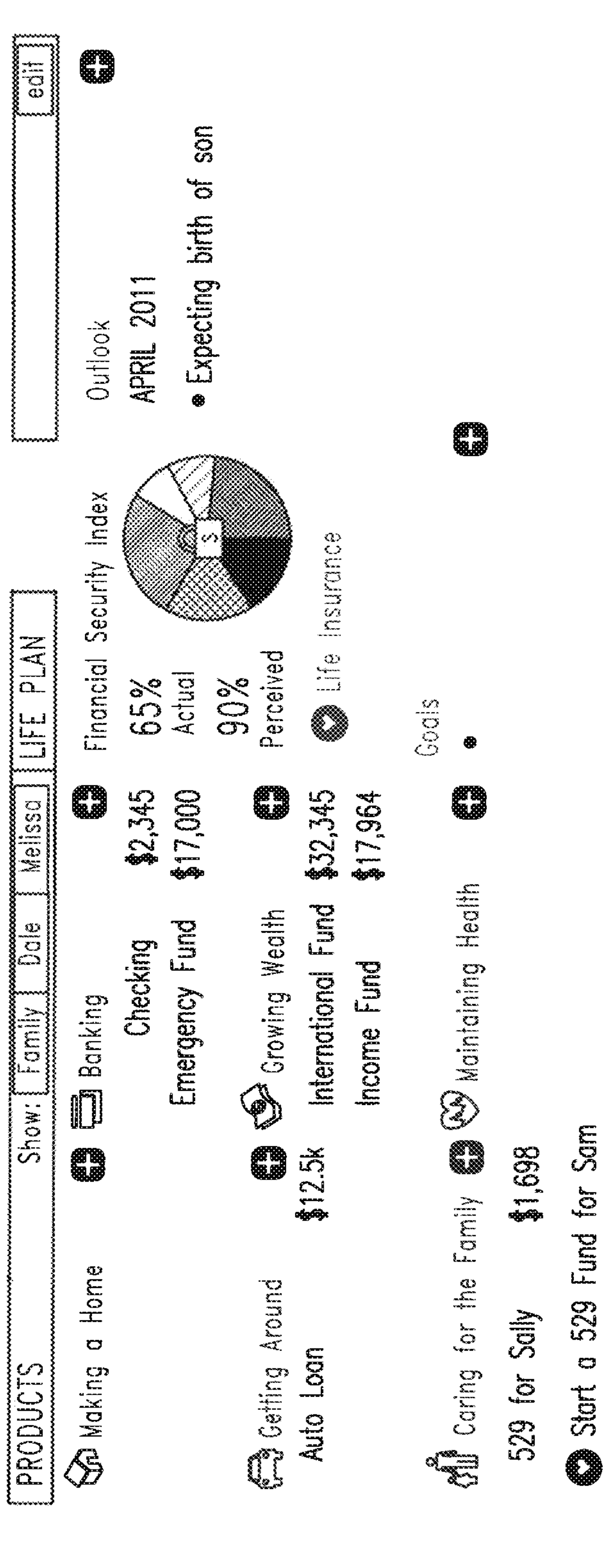

It is expected that a plurality of screens related to the customer are presented to the customer service representative by the integrated desktop program running in the system. For example, screenshots 500, 600 of FIGS. 5A and 6A, respectively, may be presented separately or on a split screen for review by the customer service representative. In order to provide more clear information regarding screenshot 500, FIG. 5B-D are provided to illustrate subparts of screenshot 500. The details of FIGS. 5A-D are self-explanatory and thus, not described in great detail herein.

In order to provide more clear information regarding screenshot 600, FIG. 6B-E are provided to illustrate subparts of screenshot 600.

Referring again to FIG. 3, the system 100 may generate, prioritize and display future actions predicted by the customer's information and business rules (step 1002). The screen shots 500, 600 of FIGS. 5A and 6A are examples of the information presented to the customer service representative.

Referring now to FIGS. 5A-D, based upon the information gathered by the customer service representative, the integrated desktop program generates and displays additional information while prioritizing future actions (step 1002 of FIG. 3). The customer service representative typically reviews screenshots 400, 500, 600. Initially, during the interaction with the customer, typically a call, the customer service representative reinforces the customers connection to the company by being familiar and dexterous with the details related to the customer. As the customer service representative navigates the various screenshots and interacts with the customer, the customer service representative begins to understand the larger context of the customer while encouraging the customer to share their story and enter salient details into the system 100. This process helps the system 100 and the customer service representative to identify the customer's intent and needs.

Referring again to FIG. 3, at step 1003, the system 100 may also generate and, prioritize and display a conversation plan 602 (see FIG. 6B), which is part of screen shot 600 of FIG. 6A. The conversation plan may include one or more topics. Each topic may include, for exemplary purposes only, a question for the representative to ask the customer, a topic to be raised, and/or a recent change to the customer's services and/or situation. Further, each topic displayed on the representative's computer may include one or more links, each link providing the ability for the representative to quickly access different information/functionality. For example, if a topic is to ask about the customer's existing car insurance policy, the link may allow the representative to quickly and automatically open the customer's policy (step 1005).

In yet another example, if the topic is to ask if the customer would like to initiate life insurance, the link may allow the representative to quickly and automatically access the ability to generate and configure life insurance quotes. It is contemplated herein that the link may be a hyperlink (e.g., such as in web browsers) that opens in the same "page", the link may be a hyperlink that opens a new "page", clicking the link may start a different program/application on the representative's computer, or any other functionally equivalent or similar computerized transition mechanisms as known in the art.

Figure 9:
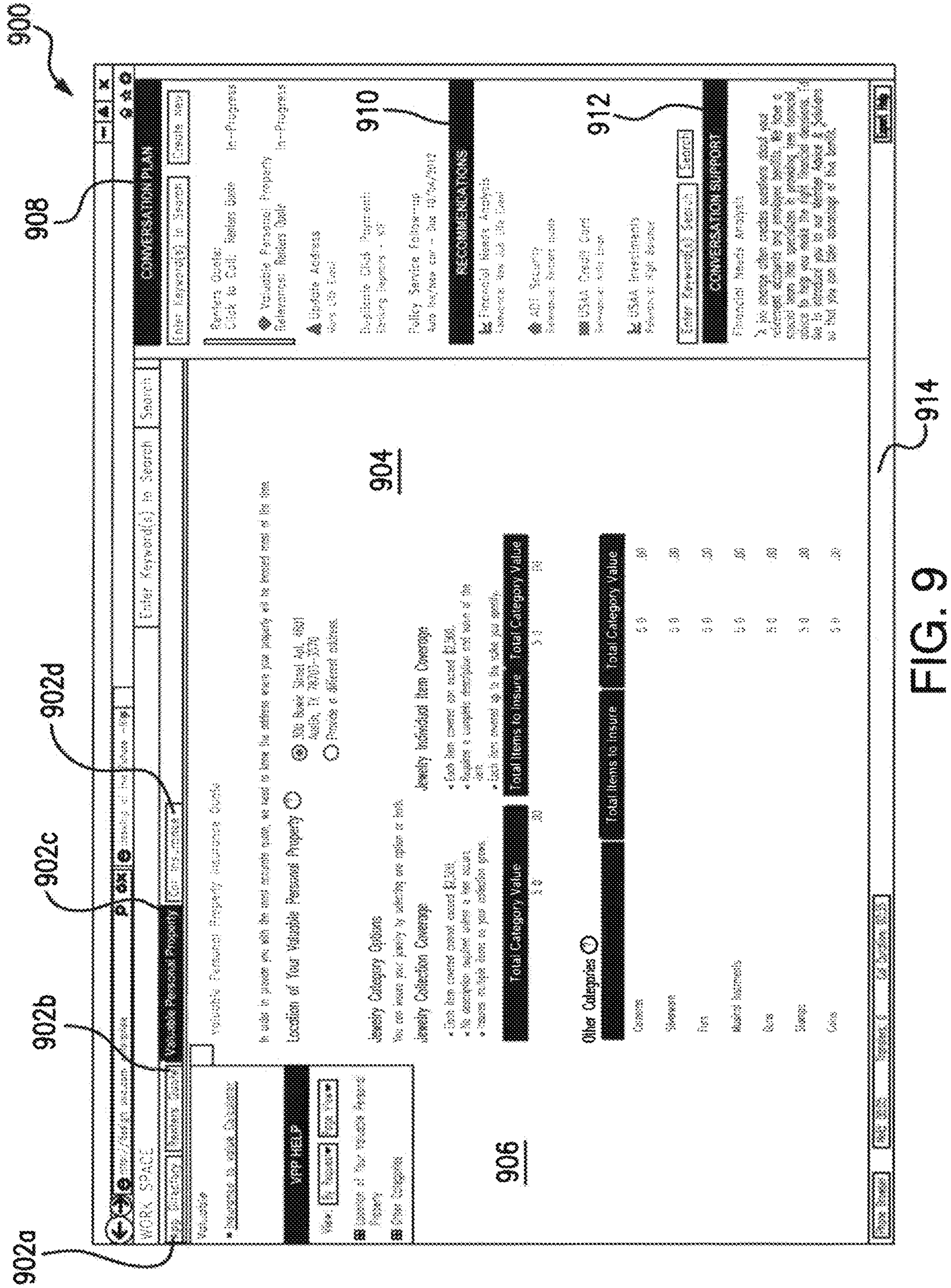
FIG. 9 is still another exemplary screen shot for review by and interaction with a customer service representative in accordance with the subject technology.

In one embodiment, the system 100 creates a screen 900 with tabs 902*a-d* to access and create various quotes as shown in FIG. 9. The tabs 902*a-d* allow the customer service representative to quickly and easily generate a quote in response to a request for a quote by the customer. The system 100 provides access to: 1) the main customer information, which remains open in a second screen or is available directly from screen 900; and 2) toggling between multiple open quotes 902*c* and 902*d* without requiring saving of each quote.

Figure 6B:
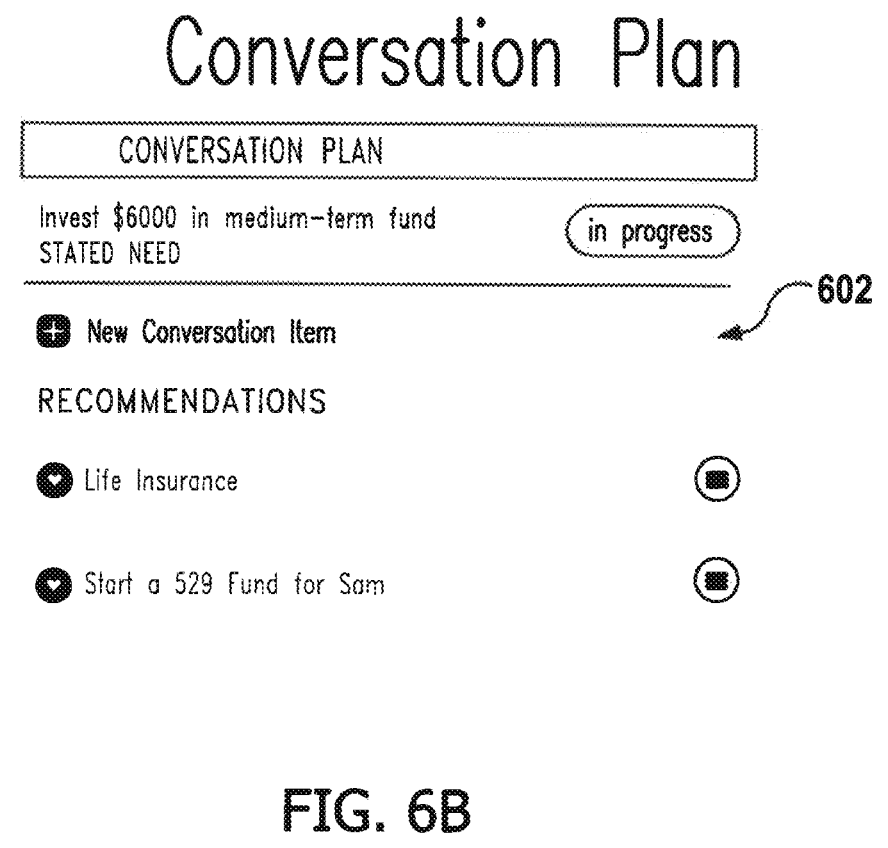

Returning again to the dialog or conversation between the customer and the customer service representative, conversation plan area 602 of FIG. 6B illustrates a conversation plan for an in progress interaction between a customer service representative and a customer. The customer is being helped with a $6,000 investment but in view of indications that a new baby had just arrived in the family, the system 100 was recommending that discussion related to life insurance and starting a 529 college saving fund be started for the new baby, Sam.

Figure 6C:
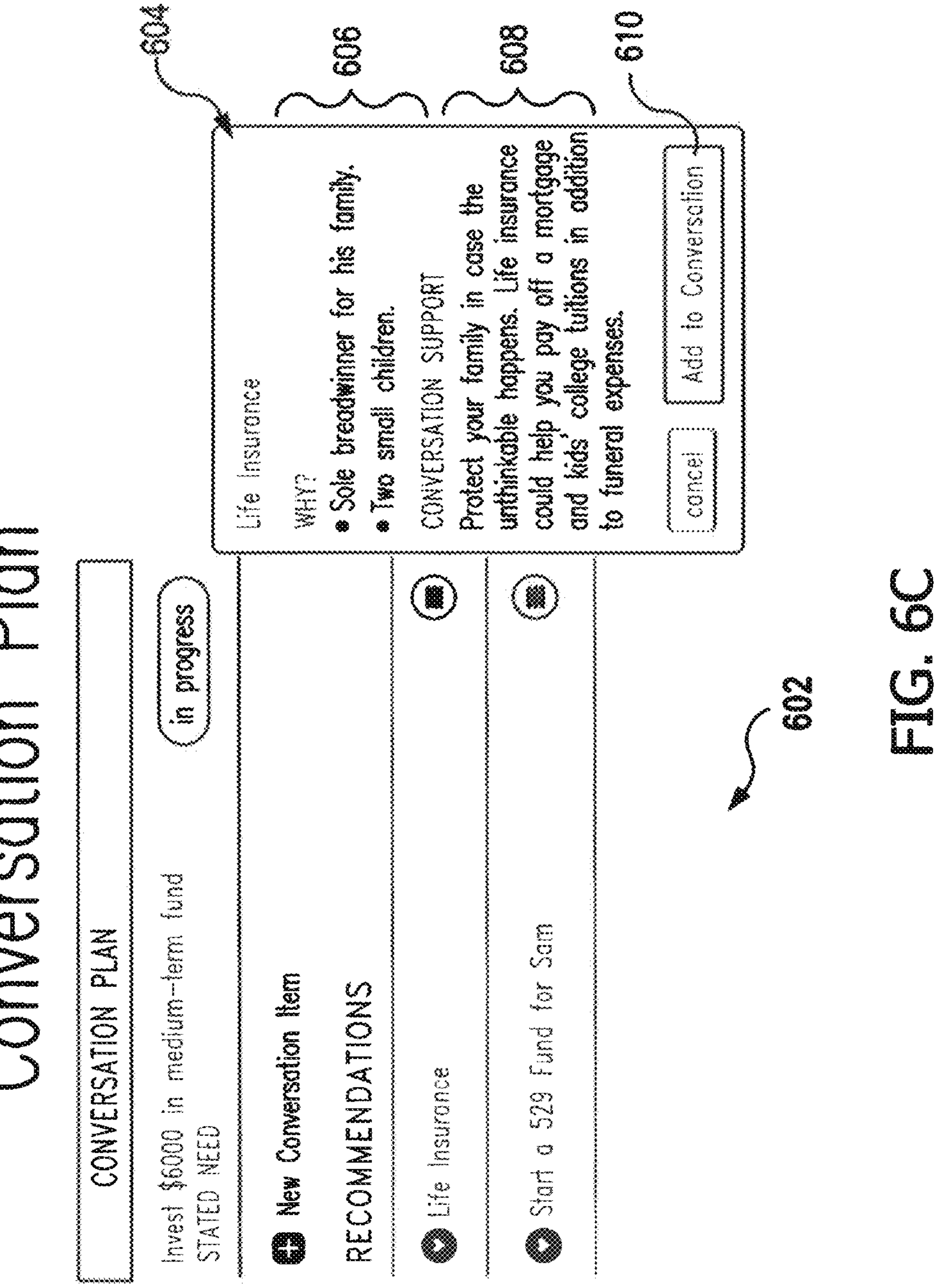
Figure 6F:
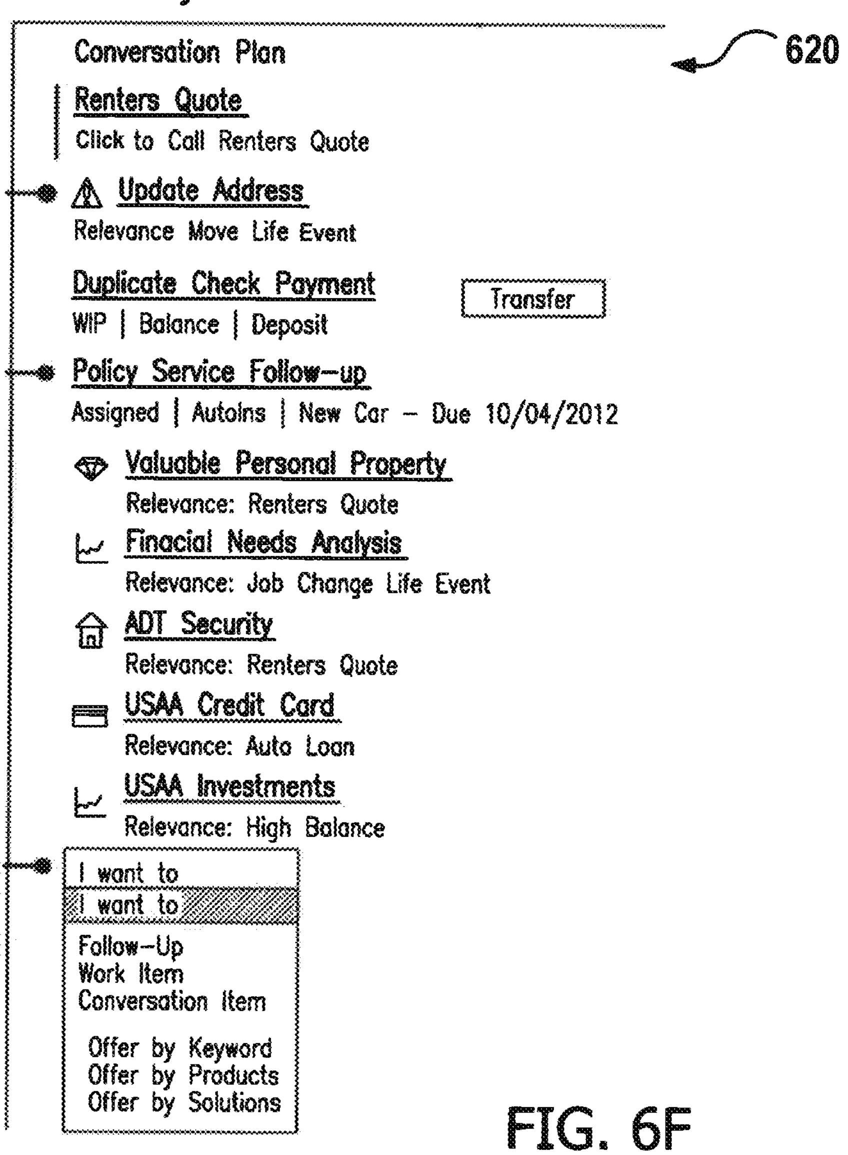

As the customer service transitions into the recommended topics and indicates such, the system 100 presents an additional suggestions and elements area 604 as shown in FIG. 6C. The suggestions and elements area 604 provides talking points 606 and supporting dialog 608 for the customer interaction. The customer service representative can also easily enter these points into the record of the interaction by selecting an "Add to Conversation" button 610. Of course, this technology is equally applicable to "online chat", instant messaging, video conferencing and other forms of interaction. As the interaction proceeds, the system 100 provides additional information as the customer service representative enters additional information about the interaction. For example, a conversation support area 614 as shown in FIG. 6E is presented to the customer service representative to assist with the discussions related to life insurance and 529 college savings accounts.

Referring to FIG. 6D, throughout the customer interaction, the customer service representative is managing the $6,000 investment via the Options Explorer portion 612 of the screen shot 600. It is also envisioned that as data is entered into the system 100 by the customer service representative, the screens 500,600 will change. For Example, FIG. 6E illustrates a changed portion 620 of screen 600. Portion 620 helps the customer service representative discuss relevant offers, follow-up on tasks, and attend to housekeeping for the customer without introducing undesirable pauses in the interaction.

By discussing the customer's needs in view of their current life situation, the customer service representative guides the customer in a discussion of recommended solutions, options and opportunities. Because of the assistance of the integrated desktop program running on the system 100, the customer service representative helps the customer think through concerns and possible objections. By making the customer feel empowered to decide on the course of action, the customer is willing and likely to select solutions, products and services of the company that best address their needs and aspirations. The integrated desktop helps the customer service representative see a global view for the customer and respond when the customer requests assistance. By asking questions to make sure that the customer service representative truly understand the needs of the customer, a shared understanding of the requests and needs is accomplished. From this point, the customer and the customer service representative can engage in detailed tactical work, still within the integrated desktop, to bring decisions to fruition and tasks to completion.

In order to complete the designed plan, future action may be required. The customer service representative uses the integrated desktop to create the future plan in a tangible and actionable manner. The customer service representative passes along from the integrated desktop the relevant resources to support the customer in following their personal path to financial security and accomplishing the plan goals. Milestones, deadlines and follow up with the customer are all entered into the integrated desktop. After the interaction, the customer service representative follows up with the customer, upon prompting by the integrated desktop, via the channel of the customer's choice, to deliver tangible evidence of progress and provide support for taking the relevant next steps.

Referring still to FIG. 3, in one embodiment, and in some utilizations, based on information gathered and/or received during the phone call, a new conversation plan may be generated and displayed on the representative's computer (step 1004). For example, if the customer called to cancel their life insurance because money is currently limited, a new conversation plan may be generated that includes a topic that directs the representative to ask the customer if they would like to reconfigure their other policies (e.g., auto insurance, home insurance) to lower the premiums.

In the example of FIG. 9, not only can the customer service representative review existing products and services provided to the customer, the customer service representative can generate one or more quotes for new products and/or services to be offered to the customer. The new products and/or services are typically generated by application of business rules to data acquired during the customer interaction.

Still referring to FIG. 9, if the conversation prompts the customer to request a quote for renter's insurance, valuable personal property insurance, and car insurance, the customer service representative can prepare each quote using tabs 902*b-d*, respectively. The information related to the valuable personal property insurance quote tab 902*c* is shown in area 904. Area 904 includes address information imported from the personal information database 202 as well as helpful information such as how to protect jewelry and the ability to list other categories of valuable property for the insurance quote. Area 906 presents tools to assist the customer service representative such as an insurance-to-value calculator. Area 906 also includes help related information that is specific to valuable personal property quotes for the customer service representative.

The screen 900 also provides details for the conversation plan in area 908. The conversation plan area 908 includes status of the various quotes, information related to recent customer events, the ability to update various information, and the like. The screen 900 provides a recommendations area 910 that includes quick and easy access to other product and service areas that may be of interest to the customer including financial needs analysis, home security, credit card information, investment information and the like. Conversation support area 912 of the screen 900 provides information paired to conversation plan and recommendations areas 908, 910. For example, the conversation support area 912 provides a proposed script to discuss financial needs analysis. Lastly, the screen 900 includes a lower bar 914 with options of a phone browser and seeking help as well as details regarding the current telephone call.

Again referring to FIG. 3, information gathered during the phone call is saved to system 100 (step 1006). This information includes, for exemplary purposes only, any information communicated by the customer to the representative (e.g., I would like to increase my auto insurance coverage in a few months), any additional policies that the customer enrolled in (e.g., adding home insurance policy), changes to policies that the customer is enrolled in (e.g., reconfiguring an existing home insurance policy), and/or follow-up activities and/or conversations that may or may not be contingent upon information discussed during the phone call and/or client enrollment and/or reconfiguration of the client's existing enrollment in services.

Referring still to FIG. 3, it is contemplated herein that, in one or more embodiments, at any time in the process 100 of the customer's interaction, responsibility for the customer interaction as well as a screen that may include the customer's information and/or the conversation plan, may be transferred from one representative to another representative (step 1008). For example, if the customer requests specific details about life insurance policies in the customer's state of residence, the call may be transferred to a specialist that is familiar with the questions and/or issues that the customer may present. In this example, a transfer button may be selected in the graphical user interface (GUI) of the first representative, and automatically the customer's phone call may be transferred to the second representative, and the second representative's computer's GUI may include the customer's information as well as displaying possible insurance options that the customer may be interested in. Further, it is contemplated herein that the second representative may first be conferenced into the phone call, and after an introduction is made, the first representative may exit the phone call.

Figure 7:
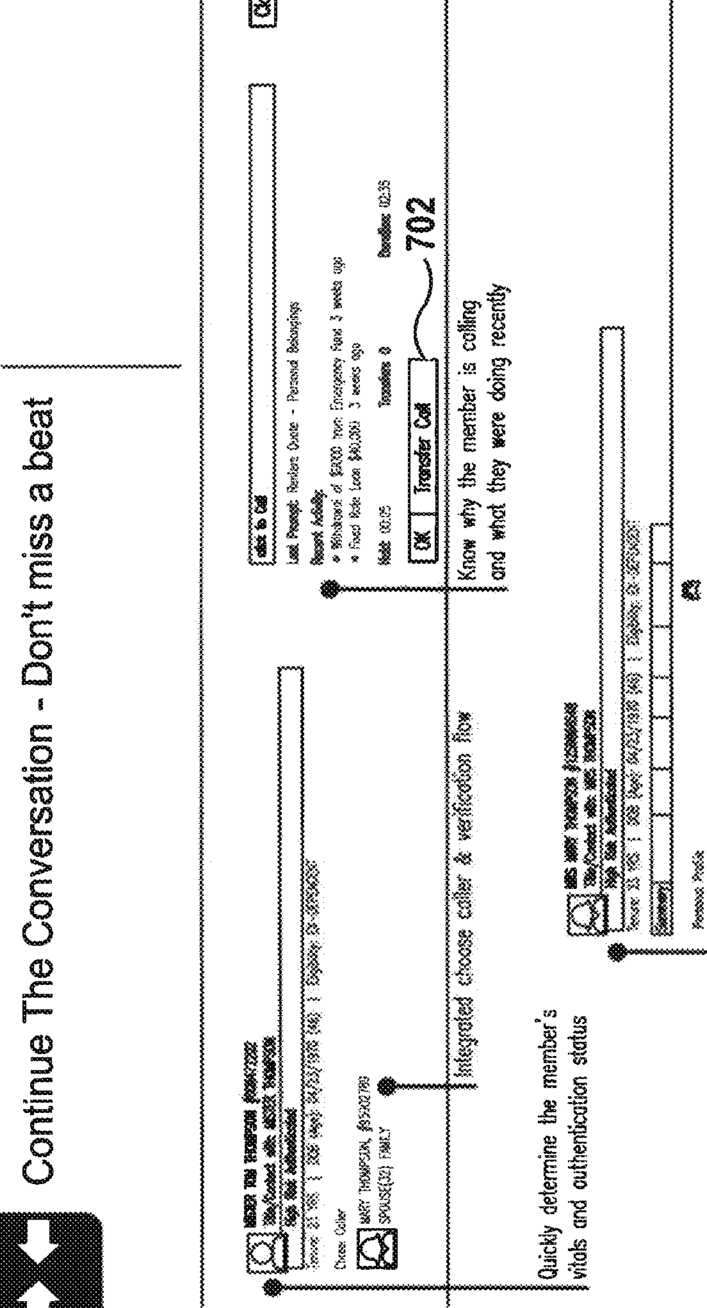
FIG. 7 is still another exemplary screen shot for review by and interaction with a customer service representative in accordance with the subject technology.

For example, FIG. 7 illustrates a portion 700 of a screen shot presented to at least the second customer service representative during a call transfer. The portion 700 may be integrated into previous screens discussed herein or presented as part of a separate screen. The portion 700 includes information to allow for determining the customer's status, last prompt, recent activities and why the interaction is being transferred. Upon getting up to speed, the second customer service representative can select the transfer call button 702.

Figure 8:
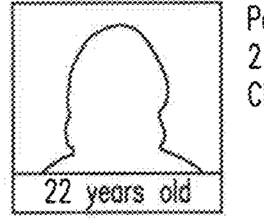
FIG. 8 is still another exemplary screen shot for review by and interaction with a customer service representative in accordance with the subject technology.

Referring to FIG. 8, an example of a pop-up call transfer synthesis area 800 is shown. Again, the call transfer synthesis area 800 may be automatically provided to both of the involved customer service representatives upon selection of the call transfer option. The call transfer synthesis area 800 includes the reason for the transfer and additional background information about the customer.

As can be seen, it is recognized that the customer service representatives will have different skill and experience levels. Thus, the system 100 may display different conversation plan items based on the skills, training and experience of the customer service representative. Additionally, the education and/or work history of the customer can impact the conversation plan/screens presented to the customer service representative(s). The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprise", "include", and conjugations thereof are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the subject invention as defined by the appended claims.

What is claimed is:

1. A computer-implemented method for streamlining interactions between a customer and a customer service representative, comprising the steps:

determining, by a processor, a conversational plan for the customer service representative to facilitate vocal interaction with the customer responsive to analysis of stored customer data relating to vocal interaction between the customer and the customer service representative;

calculating, by the processor, a predicted future action by the customer, wherein the calculation is based on the stored customer data;

displaying, by the processor, the predicted future action and the determined conversational plan on a display associated with a computer operated by the customer service representative;

determining, by the processor, one or more supplemental conversation topics relevant to the determined conversational plan for supplementing the determined conversational plan with additional conversational topics utilizing information entered by the customer service representative based upon the vocal interaction whereby the one or more supplemental conversation topics are determined in real-time upon the customer service representative entering the utilized information; and providing, by the processor, a popup interface on the display that is viewable simultaneously with the displayed predicted future action and the determined conversational plan, the popup interface including information regarding one or more supplemental conversation topics and an interactive icon selectable by the customer service representative;

wherein the information regarding the one or more supplemental conversation topics is incorporated into the displayed predicted future action and the determined conversation plan upon selection of the interactive icon by the customer service representative.

2. The computer-implemented method of claim 1, the method further comprising:

receiving, by the processor, responsive to receiving selections from the customer in a customer communication, input related to the selections; and generating, by the processor, responsive to the customer selections, an updated conversation plan.

3. The computer-implemented method of claim 2, the method further comprising, displaying, by the processor, the updated conversation plan on the customer service representative's computer.

4. The computer-implemented method of claim 1, wherein the conversation plan displayed on the customer service representative's computer includes a topic with a computerized link, wherein the method further comprises:

receiving, in the processor, notification of activation of the link; and initiating, by the processor execution of a computerized action associated with the link responsive to receiving the notification.

5. The computer-implemented method of claim 4, wherein the stored customer data includes a recent interaction between the customer and the company, the method further comprising recommending the predicted future action to the customer.

6. The computer-implemented method of claim 5, wherein the recent interaction includes a communication from the customer to the company and the predicted future action is at least partially based on an experience level of the customer service representative.

7. The computer-implemented method of claim 5, wherein the recent interaction includes an instance of the customer researching information on a website operated by the company.

8. The computer-implemented method of claim 5, wherein the recent interaction includes the customer enrolling in a service offered by the company.

9. The computer-implemented method of claim 5, wherein the customer is engaged with a service provided by the company, and wherein the recent interaction includes the customer changing a setting of the service.

10. The computer-implemented method of claim 1, wherein the predicted future action includes at least two predicted future actions, and wherein the method further comprises prioritizing, by the processor, the at least two predicted future actions.

11. The computer-implemented method of claim 10, wherein the method further comprises, displaying, by the processor, the prioritization on the customer service representative's computer.

12. A computer system having an interactive display for streamlining vocal interactions between a customer and a customer service representative of a company, comprising:

a memory configured to store instructions;

a processor disposed in communication with the memory, wherein the processor upon execution of the instructions is configured to:

analyze stored customer data relating to vocal interaction between the customer and the customer service representative;

determining, by a processor, a conversational plan for the customer service representative to facilitate vocal interaction with the customer responsive to analysis of the stored customer data;

calculate a predicted future action by the customer, wherein the calculation is based on the stored customer data;

display on a customer service representative's computer, the predicted future action and the determined conversational plan;

determine one or more supplemental conversation topics relevant to the determined conversational plan for supplementing the determined conversational plan with additional conversational topics utilizing information entered by the customer service representative based upon the vocal interaction whereby the one or more supplemental conversation topics are determined in real-time upon the customer service representative entering the utilized information; and provide a popup interface on the customer service representative's computer that is viewable simultaneously with the displayed predicted future action and the determined conversational plan, the popup interface including information regarding one or more supplemental conversation topics and an interactive icon selectable by the customer service representative;

wherein the information regarding the one or more supplemental conversation topics is incorporated into the displayed predicted future action and the determined conversation plan upon selection of the interactive icon by the customer service representative.

13. The computer system of claim 12, wherein the processor is further configured to:

receive, in response to receiving selections from the customer in a customer communication, input related to the selections;

generate, according to the selections, an updated conversation plan; and display the updated conversation plan on the customer service representative's computer.

14. The computer system of claim 12, wherein the stored customer data includes a recent interaction between the customer and the company, whereby the processor is further configured to recommend the predicted future action to the customer.

15. The computer system of claim 14, wherein the recent interaction includes a communication from the customer to the company and the predicted future action is at least partially based on an experience level of the customer service representative.

16. The computer system of claim 14, wherein the recent interaction includes an instance of the customer researching information on a website operated by the company.

17. The computer system of claim 14, wherein the recent interaction includes the customer enrolling in a service offered by the company.

18. The computer system of claim 14, wherein the customer is engaged with a service provided by the company, and wherein the recent interaction includes the customer changing a setting of the service.

* * * * *